June 14, 1927.

J. C. PAYNTER

TIRE MOLD

Filed June 14, 1924

INVENTOR:
John Clifford Paynter
BY
ATTORNEY

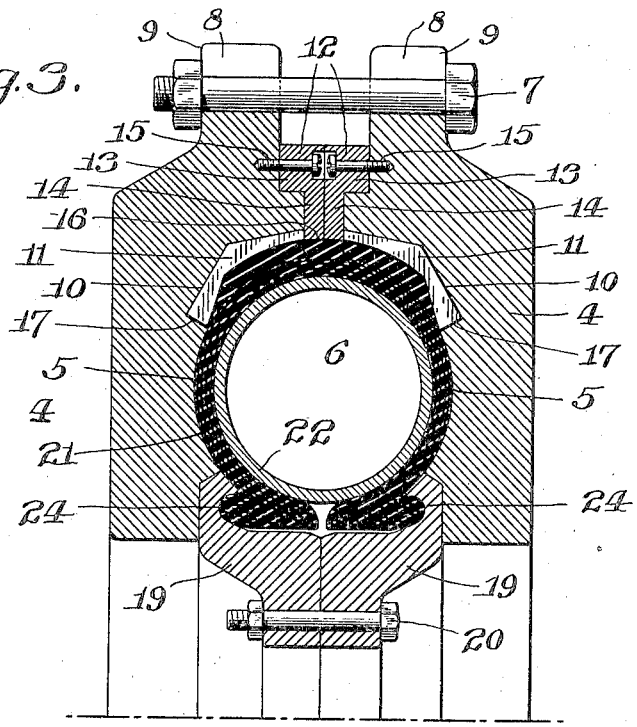
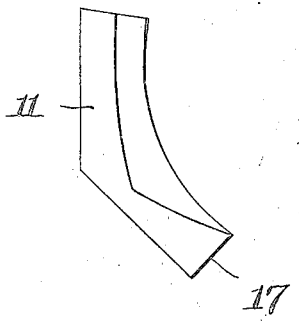
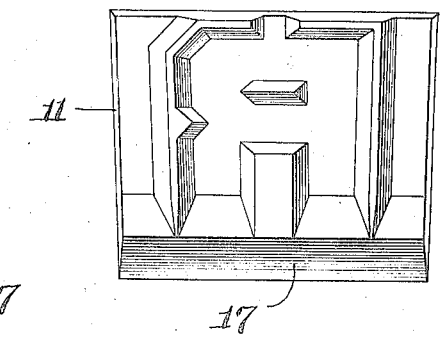

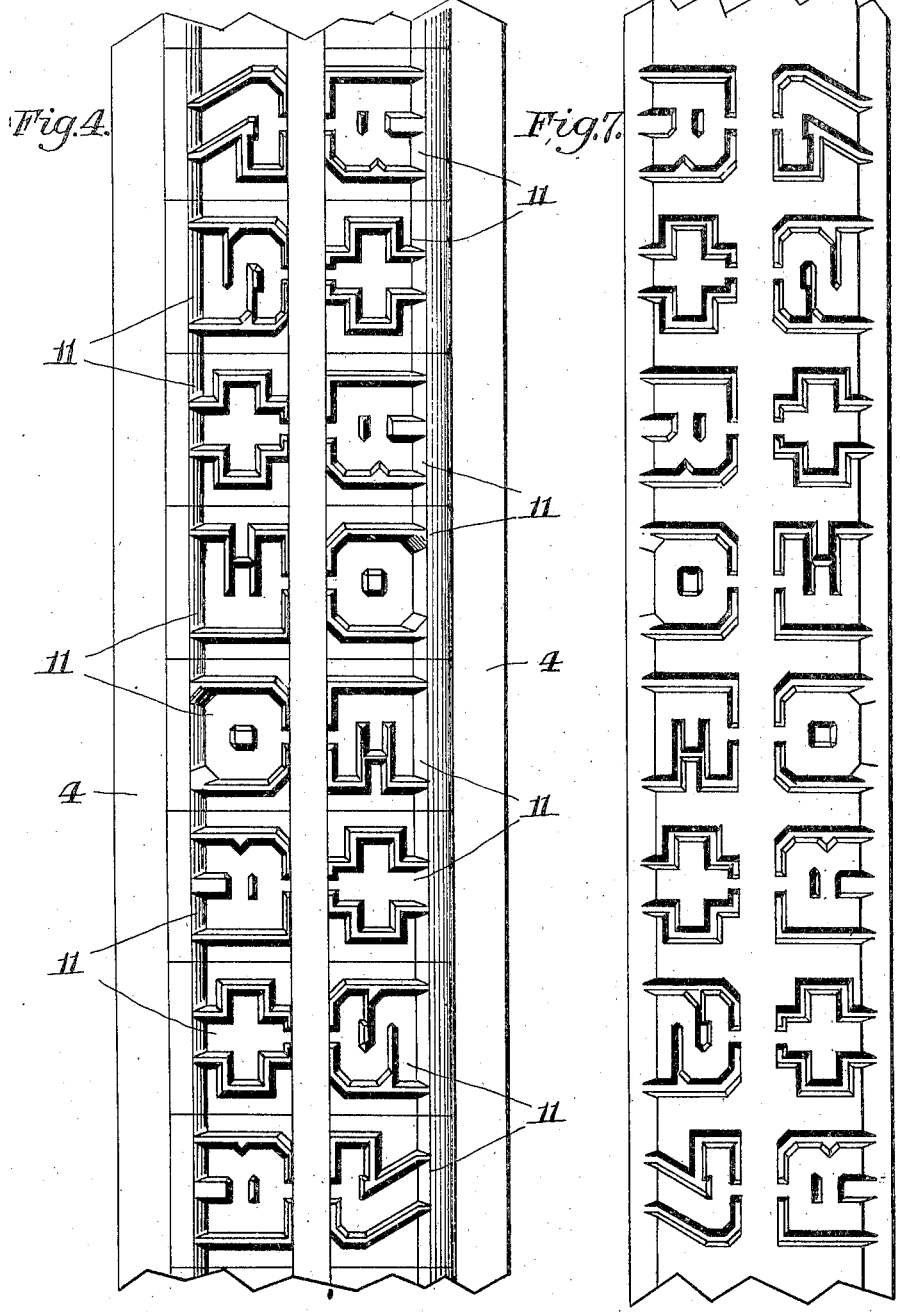

Patented June 14, 1927.

1,632,310

UNITED STATES PATENT OFFICE.

JOHN CLIFFORD PAYNTER, OF PHILADELPHIA, PENNSYLVANIA, ASSIGNOR TO PAYNTER CORPORATION, OF PHILADELPHIA, PENNSYLVANIA, A CORPORATION OF DELAWARE.

TIRE MOLD.

Application filed June 14, 1924. Serial No. 720,008.

My invention relates to improvements in tire molds and the art or method of molding tires in which provision is made for forming configurations or designs in the rubber of the outer portion of the tire.

One object of my invention is to provide a molding ring or arc made of a plurality of interchangeable sections, for molding the tread or other portion of a tire, in which the several sections are provided with molding cavities forming different characters which, when the sections are arranged in prescribed orders, convey definite meanings which serve to identify the tires on which they are to be formed with the owner and user thereof.

A further object of my invention is to provide the interchangeable sections of such ring or arc with letter, numeral or symbol designs in intaglio so that when the rubber of the tire is molded in contact with the same, the letters, numerals or other symbols will appear in cameo.

A further object of my invention is to provide suitable mechanical means whereby such interchangeable sections may be properly held in the mold and readily removed, interchanged and replaced.

A further object of my invention is to provide a mold from which a number of tires of the same size may be produced, having different embossed letters, numerals and designs thereon; my improved construction obviating the necessity of engraving separate designs in rings or arcs for use with the tire mold for the purpose desired. By having a sectional ring or arc, with sections of segmental form and comprising the alphabet, with numerals and symbols to serve as spacers, the names and addresses of the purchasers and users of the tires can be embossed in the rubber thereof. Standard segmental forms having any suitable design to give the tread a complemental appearance can be used to complete the tread ring or other annular portion of a tire when short names and addresses are to be applied.

These and other features of my invention are hereinafter more fully described and claimed, reference being had to the following description and accompanying drawings, in which:

Fig. 3 is an enlarged cross sectional view of the mold on the line 3—3, Fig. 1, showing a tire in position.

Fig. 4 is an enlarged plan view of a portion of the segmental tread ring developed in a flat plane.

Fig. 5 is an enlarged plan view of one of the segmental sections making up the tread ring.

Fig. 6 is an edge view of the same.

Fig. 7 is a plan view of the finished tread of a tire developed in a flat plane.

Figure 1:
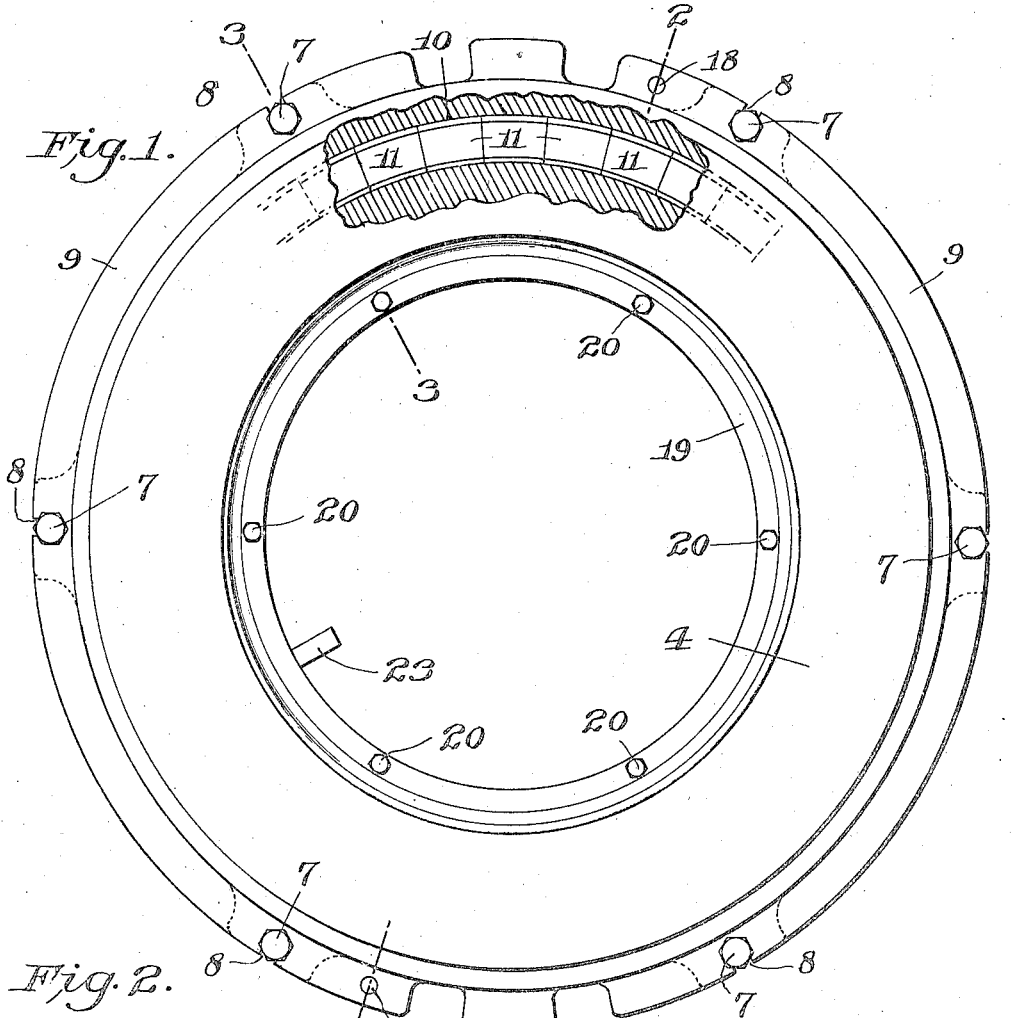
Figure 1 is an elevation partly in section, of a tire mold made in accordance with my invention.
Figure 2:
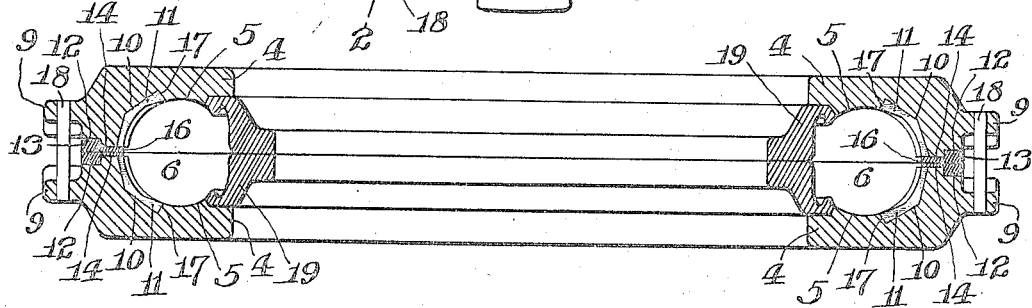
Fig. 2 is a cross sectional view of the mold on the line 2—2, Fig. 1.

Referring to the drawings, the main body of the mold is formed by two separable rings or members 4, 4, each provided with a circumferential concave groove 5, which, when the rings are placed together form an annular chamber 6 to receive the carcass of the shoe of a pneumatic tire. The ring members 4 are detachably secured together by bolts 7 which extend through registering notches or holes 8 in flanges 9 which project outwardly from the members 4. To insure proper registry of the members 4 with each other when they are placed together I provide suitable dowel pins 18, which extend through the flanges 9.

In carrying out my invention I provide each ring member 4 with a circumferential groove 10. In the tread portion of each section 4 of the mold; such grooves forming seats for the reception of interchangeable segmental sections 11 which fit within the circumferential grooves 10 of the members 4. These segmental sections are of unit dimensions and are so designed that their end walls abut on radial lines, struck from the center of the mold, and when placed end to end in a circular series they fill the circumferential grooves 10 of the mold sections 4 and they constitute a portion of the molding surface of the wall of the molding chamber 6.

The segmental members 11, are locked in place after they have been assembled in proper prescribed order, and for this purpose I provide rings 12 which may be continuous or segmental as may be desired. These rings 12 have outer portions 13 fitted to annular grooves formed at the edges of the mold members 4 and inner portions or flanges 14 which extend inwardly and overlie the inner edges of the segmental sections 11, and they are detachably secured to the members 4 by suitable screws 15 which extend through holes in the outer portions 13 of the rings 12, and which are screwed into the members 4. The inner surfaces 16 of the locking rings 12 coincide with the deepest surfaces of the cavities in the segmental molding sections 11 so as to form the highest portion of the tread of the tire centrally thereof intermediate the rows of segmental sections which form the name, address, or identifying marks of the owner.

It will be noted that when the locking rings 12 are secured to the members 4, the inner portions 14 and the opposing walls 17 of the grooves 10 will hold the segmental sections 11 in place and prevent their displacement from within the grooves until the locking rings are removed from the members 4. When the locking rings 12 are removed, the segmental molding sections 11 may be quickly and easily removed, rearranged, replaced, or substituted for others to form any desired name, address or other designation.

It will be understood, of course, that the molding walls of the segmental members outlining the letters, figures, symbols, etc., are substantially wedge-shape so as to permit ready stripping of the molded tire from the same.

It will be observed on reference to Fig. 4 of the drawings that the molding cavities of certain of the segmental sections 11 are in the form of letters of the alphabet, that the cavities of certain other sections 11 are in the form of numbers, and that the cavities of certain other sections 11 are in the form of a cross and serve as spacers for the letters and numbers.

The inner circumferential edge portions of the tire carcass are held together by two detachable rings 19, which are secured together by transverse bolts 20 and which are seated in opposing grooves in the inner portions of the mold members 4, as clearly shown in the drawings.

Within the tire carcass 21 is an annular air tube 22, which is inflated through a suitable tube 23 extending outwardly between the rings 19 and which serves to press the tire carcass 21 firmly against the molding surfaces of the mold and to prevent the buckling of the carcass during vulcanization.

In molding a tire carcass in accordance with my invention, and assuming that the identifying characters to be molded therein constitute the name and address of the owner and user of the tire to be molded, I proceed as follows:

I select from a suitable set of segmental sections 11 the ones which correspond with the letters and numbers and the spacers therebetween for the formation of the desired name and address, and place the selected sections in close relationship within the groove 10 of one of the mold members 4. If the selected sections do not extend entirely around the circumferential groove 10, the remaining portion of the groove is filled with spacer sections. The locking ring 12 is then secured to the mold member 4 to lock the sections 11 in place in the groove 10 therein. Likewise, the other mold member 4 is provided with like segmental molding sections. The rings 19 are then applied to the clincher ribs 24 on the inner edge portions of a tire carcass 21 having the air tube 22 therein and having a plain rubber tread portion. The carcass 21 and rings 19 are then placed within one of the mold members 4, and, thereafter, the other mold member 4 is placed upon the inserted carcass 21 and rings 19 and the two members 4 are secured together by means of the bolts 7, confining the carcass 21 therein. The air tube 22 within the carcass 21 is now inflated, and, thereafter, the entire mold with the carcass therein is subjected to heat to effect the vulcanization in the usual manner. During vulcanization the pressure of the air tube 22 and the flow of the rubber causes the rubber of the carcass to expand into and completely fill the cavities of the segmental molding sections 11 and the space between them within the locking rings 12 and thereby forms upon the tire the characters or the letters, numbers and crosses of the sections.

In the drawings, it will be observed, that the letters, numbers and spacers form the identifying indicia "R+Roe+27" which may form part of a complete name and address, as follows: R+Roe+27+William+St+New+York.

It will now be understood that any desired name and address may be molded in a tire by merely selecting from a suitable set of segmental molding sections the sections having the cavities which form the desired letters and numbers and the desired spacers and arranging them in the mold in the prescribed order to form the desired name and address; or the same segmental sections shown in Fig. 4 may be rearranged in a different prescribed order to form different identifying indicia, such for example as E+Orr+72.

It will be observed that each segmental section 11 has, in addition to its central tread forming cavity which forms its letter or other characters, end tread forming cavities, and that each end tread forming cavity of each segmental section communicates with the end tread forming cavity of the end of the section next adjacent thereto, so that the central cavities of the sections will mold the letters or other characters outlined thereby as a part of the tread portion of the tire and so that each two combined end cavities of the sections will mold suitably shaped tread portions between but spaced from the tread forming letters or other characters, as clearly shown in Figs. 4, 5 and 7.

I claim:

1. A tire mold comprising separable members forming a chamber to receive the carcass of a tire, means to secure said members together, one of said members having an annular groove formed therein, a set of interchangeable molding sections seated in said groove, and a part having a molding surface detachably secured to said grooved member and holding said sections in place therein.

2. A tire mold comprising separable members forming a chamber to receive the carcass of a tire, means to secure said members together, one of said members having an annular groove formed therein, a set of interchangeable molding sections seated in said groove, a ring seated against said grooved section and preventing the removal of said sections from said groove, and means for detachably securing said ring to said grooved section.

In witness whereof I have signed this specification.

JOHN CLIFFORD PAYNTER.